United States Patent
Izumi et al.

(10) Patent No.: US 6,254,962 B1
(45) Date of Patent: Jul. 3, 2001

(54) OZONE ADSORBENT, OZONE-ADSORBING MOLDED PRODUCT, AND METHOD OF MAKING SAME

(75) Inventors: Jun Izumi; Akinori Yasutake; Nariyuki Tomonaga; Hiroyuki Tsutaya, all of Nagasaki (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 09/282,739

(22) Filed: Mar. 31, 1999

(30) Foreign Application Priority Data

Apr. 3, 1998 (JP) .................................................. 10-091815

(51) Int. Cl.[7] ........................................................ B32B 03/12
(52) U.S. Cl. ............................................ 428/116; 264/631
(58) Field of Search ............................... 428/116; 264/631

(56) References Cited

U.S. PATENT DOCUMENTS

| 4,259,299 | 3/1981 | Hagiwara et al. .................... 423/210 |
| 5,316,993 | 5/1994 | Sextl et al. .............................. 502/68 |
| 5,583,277 | 12/1996 | Kuehl ................................... 585/820 |

FOREIGN PATENT DOCUMENTS

| 2186841 | 4/1997 | (CA) . |
| 2236611 | 11/1998 | (CA) . |
| 1 592 282 | 12/1970 | (DE) . |
| 0 277 843 A2 | 8/1988 | (EP) . |
| 0 516 949 A1 | 12/1992 | (EP) . |
| 0 767 002 A1 | 4/1997 | (EP) . |
| 0 776 696 A2 | 6/1997 | (EP) . |
| 02131440 | 5/1990 | (JP) . |
| 890149505 | 1/1991 | (JP) . |

*Primary Examiner*—Francis J. Lorin
(74) *Attorney, Agent, or Firm*—Anderson, Kill & Olick P.C.

(57) ABSTRACT

An object of the present invention is to provide an ozone adsorbent which has high ozone-adsorbing power even in a moisture-containing system and exhibits a high degree of ozone retention (and a low degree of ozone decomposition), as well as a molded product made by molding this ozone adsorbent into a form adapted to practical use, and a method of making the same. The present invention provides an ozone adsorbent comprising one or more members selected from the group consisting of high-silica pentasilzeolite having a $SiO_2/Al_2O_3$ ratio of not less than 70, dealuminized faujasite having a $SiO_2/Al_2O_3$ ratio of not less than 20, and mesoporous silicate having a $SiO_2/Al_2O_3$ ratio of not less than 20, as well as an ozone-adsorbing molded product and a method of making the same.

4 Claims, 11 Drawing Sheets

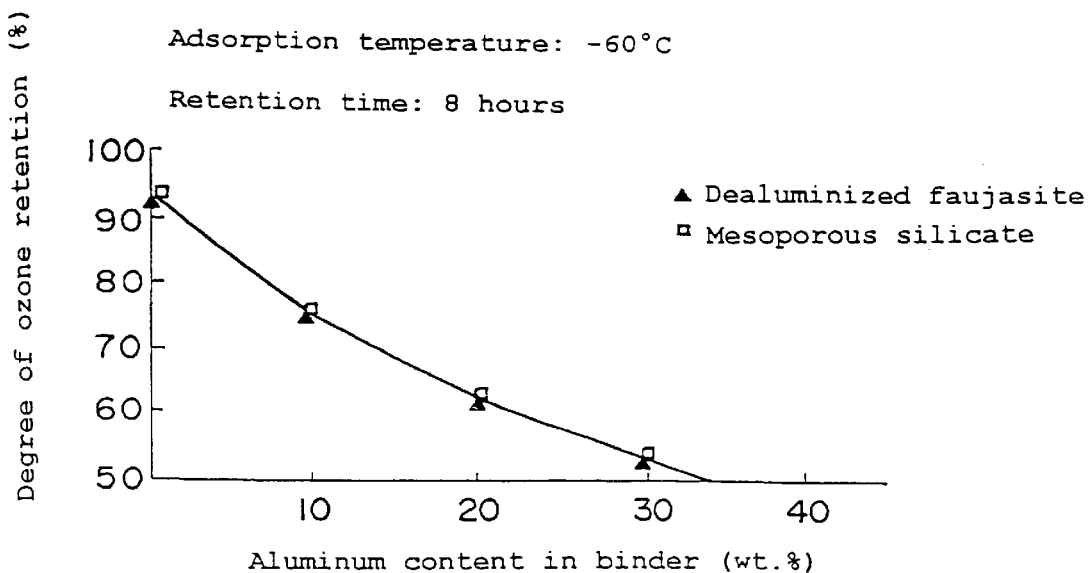
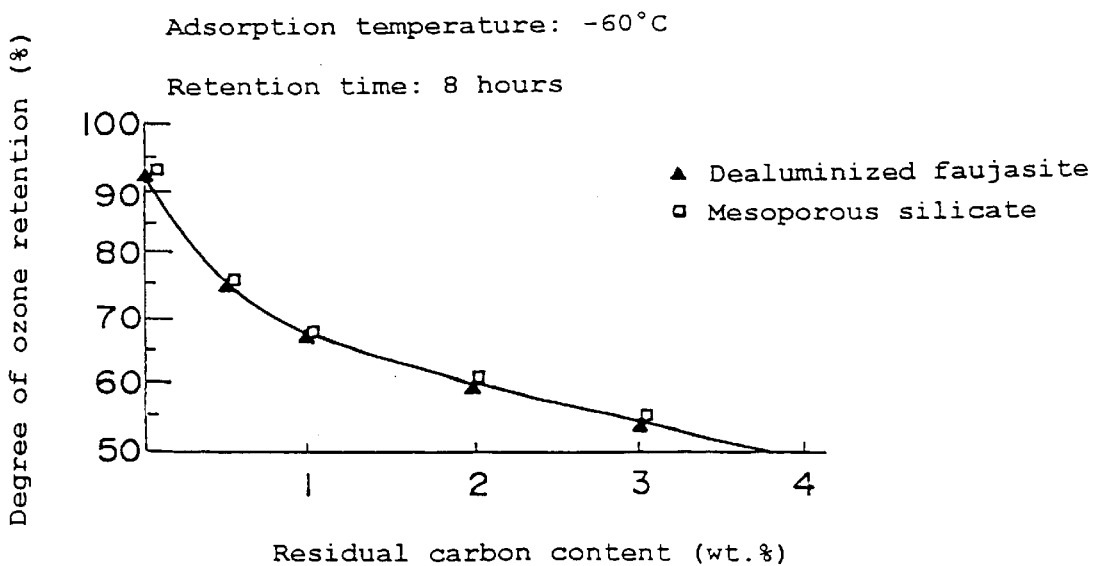

OZONE ADSORBENT, OZONE-ADSORBING MOLDED PRODUCT, AND METHOD OF MAKING SAME

FIELD OF THE INVENTION AND RELATED ART STATEMENT

This invention relates to ozone adsorbents having excellent ozone-adsorbing power and exhibiting a low degree of ozone decomposition, and particularly to ozone adsorbents which are suitable for the storage of ozone or for use in a pressure-swinging or temperature-swinging adsorption process for the concentration of ozone. Moreover, this invention also relates to molded products made by molding such an ozone adsorbent into a desired form, and a method of making the same.

Ozone is an oxidizing agent which is so clean as not to cause secondary environmental pollution and can be handled easily. Consequently, it is being widely used in the fields of sterilization, cleansing, oxidation bleaching and the like.

On the other hand, ozone is easily decomposable, so that it cannot be stored in a gas cylinder or the like. Generally, ozone produced by an ozone generator of the silent discharge type, the ultraviolet lamp type, the water electrolysis type or the like is directly used. Thus, it has been conventional practice to install an ozone generator at the site for use and obtain ozone by operating it as required. Ozone supplied directly from an ozone generator cannot be readily accommodated to variation in load on the consumption side.

Accordingly, there is a demand for a storage method in which ozone is previously stored by adsorption to an ozone adsorbent and may be freely desorbed in an amount required for use. However, an ozone adsorbent which can adsorb a large amount of ozone has not been developed as yet. The use of an ozone adsorbent which can adsorb only a small amount of ozone is disadvantageous from an economic point of view in that a large amount of the ozone adsorbent is required and the size of storage equipment is increased.

On the other hand, ozone generators of the silent discharge type, the ultraviolet lamp type, the water electrolysis type and the like fail to produce a high concentration of ozone. Accordingly, when a high concentration of ozone is to be used continuously, it is necessary to concentrate an ozone-containing gas according to a pressure-swinging or temperature-swinging adsorption process. However, an ozone adsorbent which shows a great difference in adsorbing power at different pressures or temperatures has not been developed as yet.

Japanese Patent Laid-Open No. 64690/'78 discloses an oxygen-recycling ozone generation system in which silica gel is used as an ozone adsorbent, ozone is generated by using liquid oxygen as a raw material, the resulting ozone-containing gas is cooled to about −60° C. and fed to an adsorption tower packed with silica gel so as to cause ozone to become adsorbed thereto, and heated dry air is introduced into the adsorption tower having ozone adsorbed therein so as to desorb the ozone by hot purging and thereby produce a gas containing a high concentration of ozone. Generally, silica gel has high moisture-adsorbing power, so that moisture is strongly adsorbed prior to the adsorption of ozone and accumulated in the adsorbent. In a moisture-containing system, therefore, the amount of ozone adsorbed is markedly decreased and a considerable amount of energy is required for the regeneration of the adsorbent. Moreover, ozone is easily decomposed upon contact with silica gel to cause a reduction in ozone recovery or ozone concentration. Furthermore, silica gel may be reduced to powder after repeated adsorption of moisture.

OBJECT AND SUMMARY OF THE INVENTION

Accordingly, an object of the present invention is to solve the above-described problems by providing an ozone adsorbent which has high ozone-adsorbing power even in a moisture-containing system and exhibits a high degree of ozone retention (and a low degree of ozone decomposition), as well as a molded product made by molding this ozone adsorbent into a form adapted to practical use, and a method of making the same.

In order to accomplish the above object, the present invention provides:

(1) An ozone adsorbent comprising one or more members selected from the group consisting of high-silica pentasilzeolite having a $SiO_2/Al_2O_3$ ratio of not less than 70, dealuminized faujasite having a $SiO_2/Al_2O_3$ ratio of not less than 20, and mesoporous silicate having a $SiO_2/Al_2O_3$ ratio of not less than 20.

(2) An ozone-adsorbing molded product made by providing an ozone adsorbent powder comprising one or more members selected from the group consisting of high-silica pentasilzeolite having a $SiO_2/Al_2O_3$ ratio of not less than 70, dealuminized faujasite having a $SiO_2/Al_2O_3$ ratio of not less than 20, and mesoporous silicate having a $SiO_2/Al_2O_3$ ratio of not less than 20, and molding the powder by use of a $SiO_2$ binder having an aluminum content of not greater than 2% by weight, the ozone-adsorbing molded product having a porosity in the range of 30 to 70% and a residual carbon content of not greater than 0.1% by weight.

(3) An ozone-adsorbing molded product as described above in (2) wherein the ozone-adsorbing molded product is in the form of a honeycomb.

(4) A method of making an ozone-adsorbing molded product as described above in (2) or (3) which comprises the steps of adding the $SiO_2$ binder and an organic pore-forming agent to the ozone adsorbent powder, molding the resulting mixture, and drying and firing the molded body to remove the organic pore-forming agent and thereby form pores.

BRIEF DESCRIPTION OF THE DRAWINGS

FIG. 6 is a graph showing the relationship between the aluminum content in the binder and the degree of ozone retention for ozone-adsorbing molded products made by molding dealuminized faujasite and mesoporous silicate in accordance with the present invention by use of a binder.

FIG. 7 is a graph showing the relationship between the residual carbon content and the degree of ozone retention for ozone-adsorbing molded products made by molding dealuminized faujasite and mesoporous silicate in accordance with the present invention by use of a binder.

Figure 1:
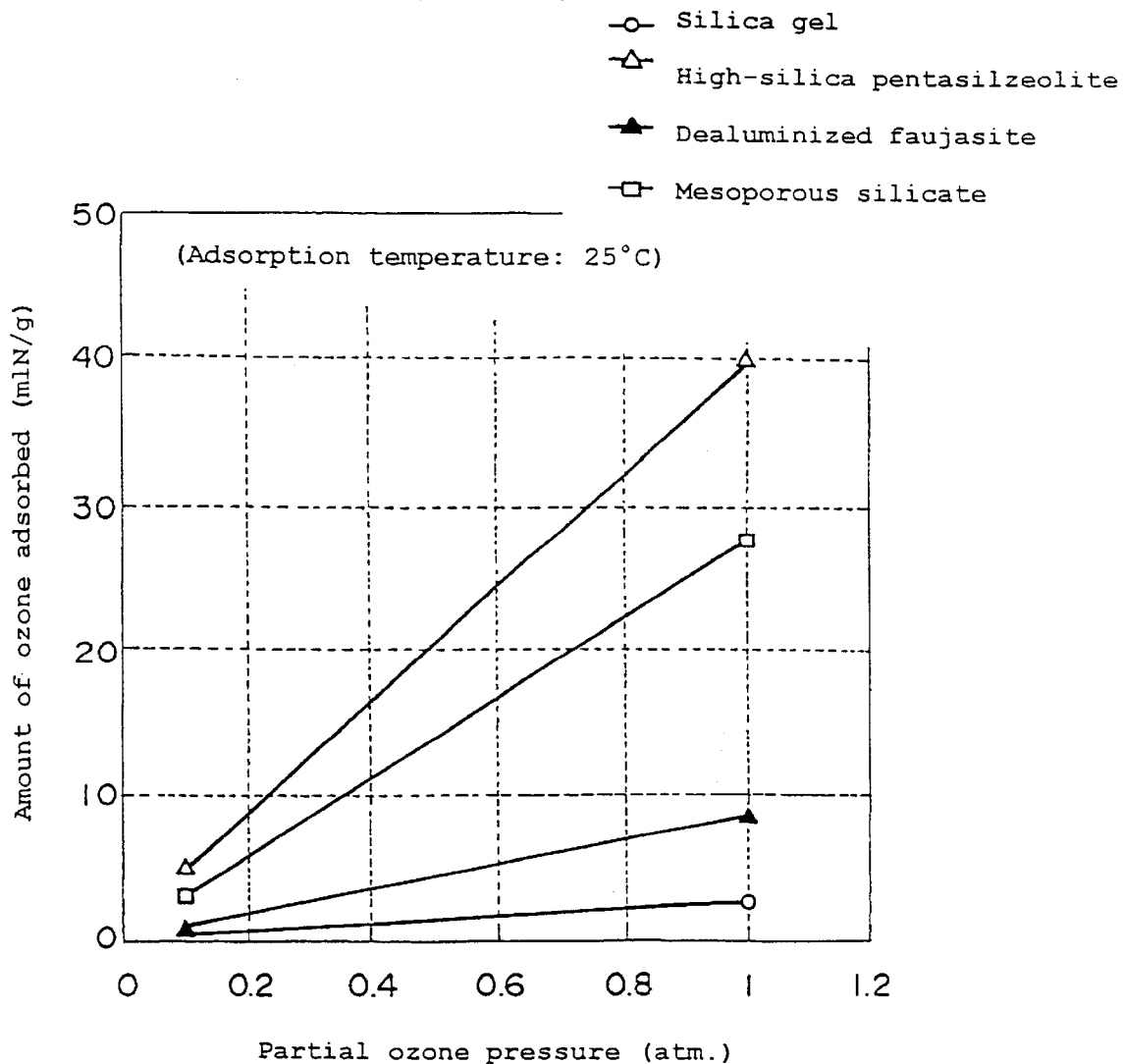
FIG. 1 is a graph showing the amount of ozone adsorbed as a function of partial ozone pressure (corresponding to adsorption pressure) for high-silica pentasilzeolite, dealuminized faujasite and mesoporous silicate in accordance with the present invention, and silica gel conventionally known as an ozone adsorbent.

The reference numerals shown in these figures are defined as follows: 1, ozone generator; 2, adsorbent container; 3, three-way valve; 4, ozone analyzer; 5 to 8, valve; 9, mass flow controller; 10, He gas.

DETAILED DESCRIPTION OF PREFERRED EMBODIMENTS

High-silica pentasilzeolite, which is an ozone adsorbent in accordance with the present invention, can be obtained by hydrothermal synthesis at a temperature of 150 to 180° C. while using sodium silicate or fumed silica as a silica source and tetrapropylammonium bromide as an organic template. In order to present a feature of the present invention which is characterized by a large amount of ozone adsorbed even in a moisture-containing system, high-silica pentasilzeolite should have a $SiO_2/Al_2O_3$ ratio of not less than 70 and preferably not less than 100.

Dealuminized faujasite, which is an ozone adsorbent in accordance with the present invention, can be obtained by treating a Na-Y type zeolite having a $SiO_2/Al_2O_3$ ratio of about 5 with aqueous ammonia to remove most aluminum from the zeolite skeleton. In order to present a feature of the present invention which is characterized by a large amount of ozone adsorbed even in a moisture-containing system and also by a high degree of ozone retention (and a low degree of ozone decomposition), dealuminized faujasite should have a $SiO_2/Al_2O_3$ ratio of not less than 20 and preferably not less than 50.

Mesoporous silicate, which is an ozone adsorbent in accordance with the present invention, is a porous silica material having mesopores with a diameter of 10 to 1,000 angstroms and can be obtained according to various preparation processes. Its $Al_2O_3$ ratio can be controlled by modifying the conditions of preparation, and the like. In order to present a feature of the present invention which is characterized by a large amount of ozone adsorbed even in a moisture-containing system and also by a high degree of ozone retention (and a low degree of ozone decomposition), mesoporous silicate should have a $SiO_2/Al_2O_3$ ratio of not less than 20 and preferably not less than 50.

MCM-41 that is one form of mesoporous silicate has been developed by Mobil Corp. This is prepared by hydrothermal synthesis at a temperature of 140° C. and a pH of 13.5 while using water glass or sodium silicate as a silica source and a cationic surface-active agent (with 8 or more carbon atoms) as an organic template, and has a specific surface area of about 1,600 $m^2/g$ and a $SiO_2/Al_2O_3$ ratio of about 1,000.

FMS-16, which is one form of mesoporous silicate, has been developed by Kuroda, Inagaki and others. FMS16 is produced by intercalating a cationic surface-active agent into kanemite. It is similar in structure to MCM-41 and has a $SiO_2/Al_2O_3$ ratio of about 1,000.

Low-temperature mesoporous silicate (1) is a compound obtained according to a process proposed by Stucky and others. This can be synthesized at room temperature and at a pH of 1 or less by using tetraethoxysilane (TEOS) as a silica source and a cationic surface-active agent as an organic template.

Low-temperature mesoporous silicate (2) is a compound obtained according to a process developed by the present inventors. This can be synthesized at room temperature and at a pH of 1 or less by using silica-free polycondensed silicic acid as a silica source and a cationic surface-active agent as an organic template.

Figure 2:
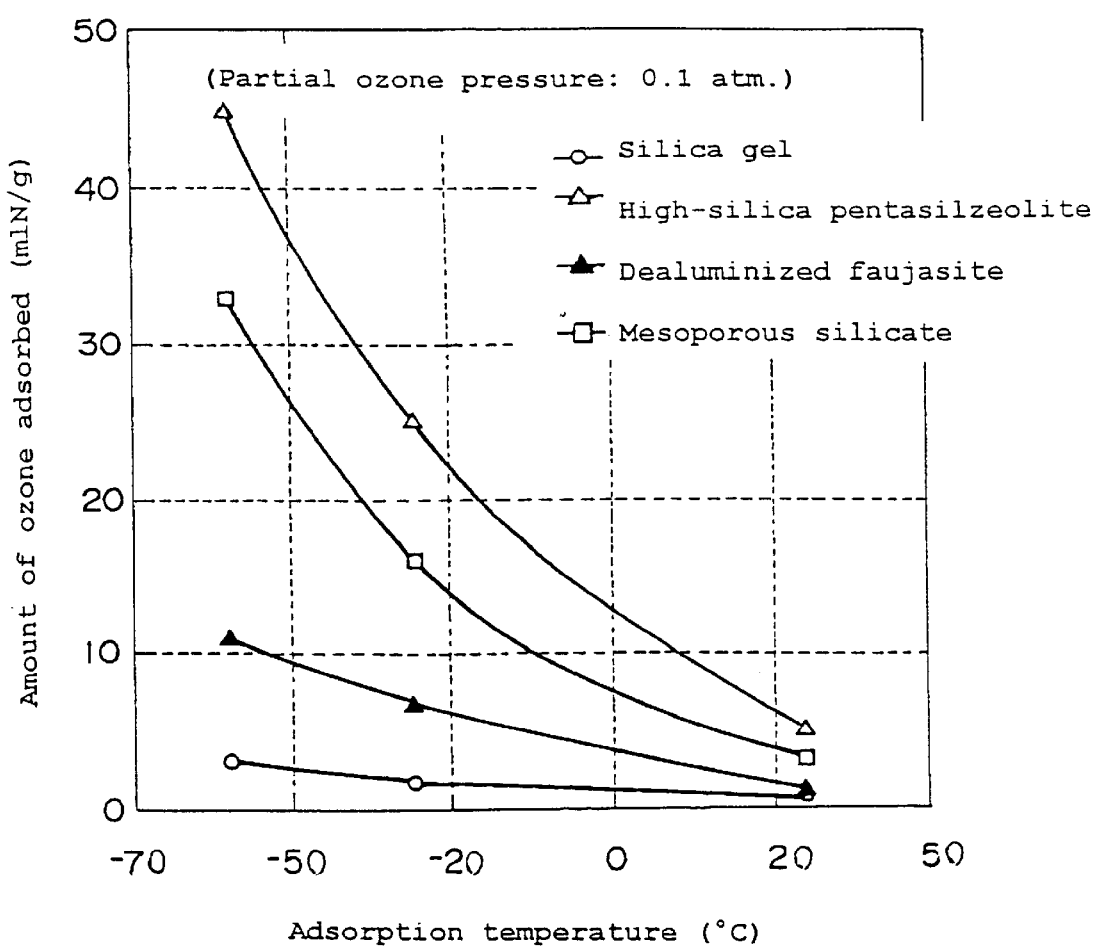
FIG. 2 is a graph showing the amount of ozone adsorbed as a function of adsorption temperature for high-silica pentasilzeolite, dealuminized faujasite and mesoporous silicate in accordance with the present invention, and silica gel conventionally known as an ozone adsorbent.

High-silica pentasilzeolite, dealuminized faujasite and mesoporous silicate, which are ozone adsorbents in accordance with the present invention, adsorb a larger amount of ozone as compared with silica gel which has conventionally been used as an ozone adsorbent (see FIGS. 1 and 2). Moreover, dealuminized faujasite and mesoporous silicate exhibit a higher degree of ozone retention (i.e., a greater ability to retain ozone without decomposing it) as compared with silica gel which has conventionally been used as an ozone adsorbent (see FIGS. 3 and 4).

With regard to each of high-silica pentasilzeolite, dealuminized faujasite and mesoporous silicate in accordance with the present invention, a series of samples whose $SiO_2/Al_2O_3$ ratios varied from 15 to 1,000 were prepared and examined for the degree of ozone decomposition. Specifically, an aqueous ozone solution at 25° C., which had an ozone concentration of 10 ppm, was passed through an adsorption tower packed with 80 liters of each of the aforesaid ozone adsorbents. After the ozone adsorbent was saturated with ozone, the ozone concentration ($C_1$ ppm) in water flowing out from the adsorption tower was measured, and the degree of ozone decomposition was calculated according to the following equation. The results thus obtained are shown in FIG. 5.

$$\text{Degree of ozone decomposition } (\%) = [(10 - C_1)/10] \times 100$$

Figure 5:
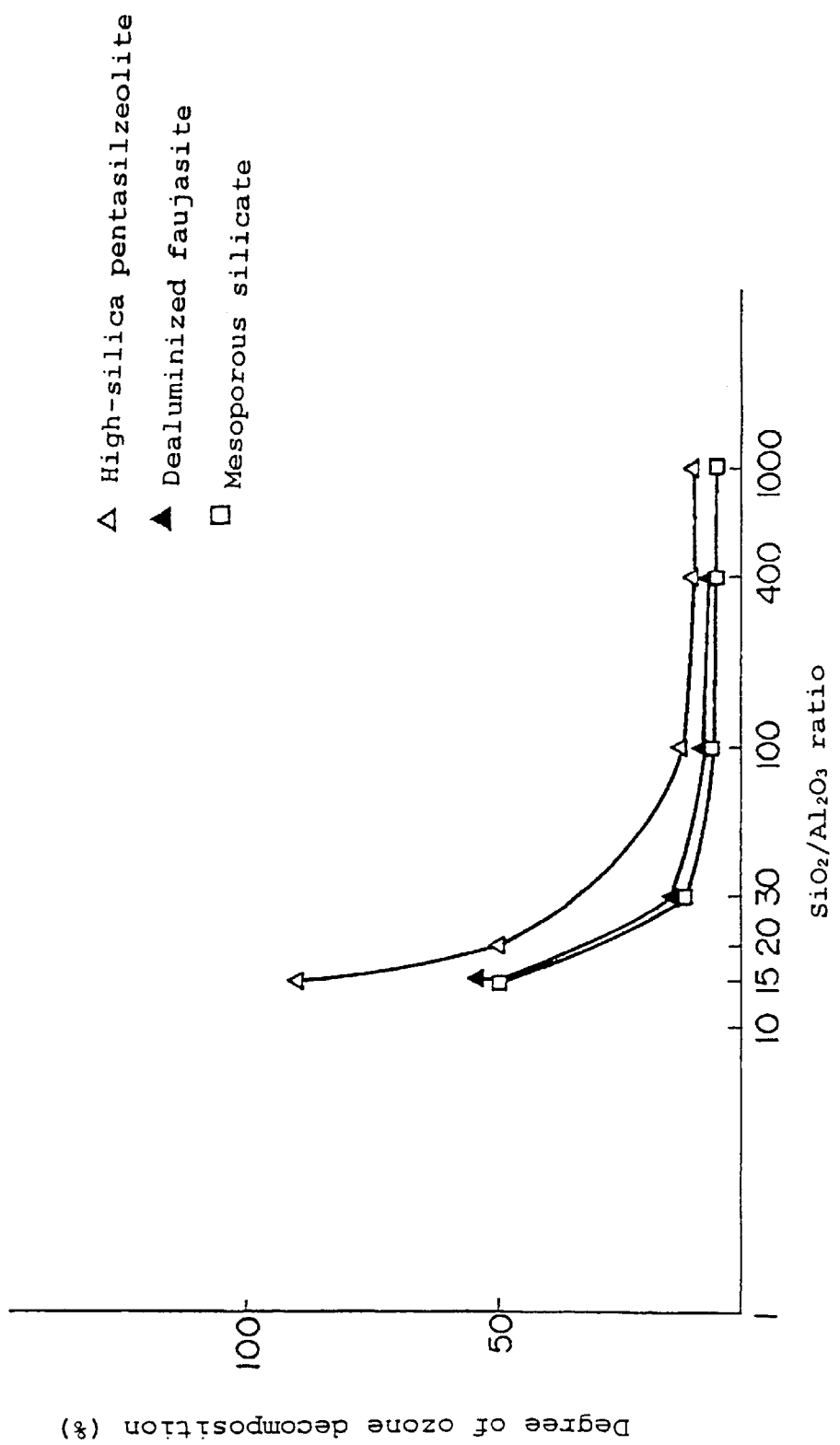
FIG. 5 is a graph showing the relationship between the $SiO_2/Al_2O_3$ ratio and the degree of ozone decomposition as determined by preparing samples varying in $SiO_2/Al_2O_3$ ratio for high-silica pentasilzeolite, dealuminized faujasite and mesoporous silicate in accordance with the present invention.

As is evident from FIG. 5, the practical range of $SiO_2/Al_2O_3$ ratio which gives a degree of ozone decomposition of not greater than 20% is not less than 70 for high-silica pentasilzeolite, not less than 20 for dealuminized faujasite, and not less than 20 for mesoporous silicate.

The ozone-adsorbing molded product of the present invention is made by adding a binder and an organic pore-forming agent (e.g., cellulose) to an ozone adsorbent powder comprising one or more of the above-described high-silica pentasilzeolite, dealuminized faujasite and mesoporous silicate, molding the resulting mixture, and drying and firing the molded body to remove the organic pore-forming agent and thereby form pores. The form of the molded product may be chosen according to the purpose of use, and specific examples thereof include honeycombs, Raschig rings, pellets and granules.

As the binder used to make the ozone-adsorbing molded product of the present invention, there may be used $SiO_2$ binders such as silica sol and water glass. In order to achieve a degree of ozone retention of not less than 90%, the aluminum content in the $SiO_2$ binder should preferably be kept within 2% by weight (see FIG. 6). The amount of binder used in the molded product is suitably in the range of 10 to 60 parts by weight per 100 parts by weight of the ozone adsorbent powder.

No particular limitation is placed on the type of the organic pore-forming agent used to make the ozone-adsorbing molded product of the present invention, so long as it exerts no adverse influence on moldability and it can be completely removed by firing. Specifically, cellulose compounds are preferably used. The amount of organic pore-forming agent used may be determined according to the type of the pore-forming agent used, the porosity required of the desired molded product, and the like. However, it is generally suitable to use the organic pore-forming agent in an amount of 10 to 30 parts by weight (as a charge level) per 100 parts by weight of the ozone adsorbent powder.

In order to make the ozone-adsorbing molded product, a suitable binder and a suitable organic pore-forming agent, together with a solvent (e.g., water), are added to an ozone adsorbent powder in the above-defined proportions. If necessary, a high polymeric flocculent is also added thereto. After this mixture is molded into a desired form, the molded body is dried and fired to remove the organic pore-forming agent and the high polymeric flocculent. The firing temperature is suitably in the range of 400 to 700° C. The molded body must be fully fired because any residual organic matter or carbon is causative of ozone decomposition. If the firing temperature is lower than 400° C., the organic matter and the like may not be fully removed, while if it is higher than 700° C., the high-silica adsorbent will undergo heat deterioration. In order to achieve a degree of ozone retention of not less than 90% from a practical point of view, the residual carbon content in the molded product should preferably be kept within 0.1% by weight (see FIG. 7).

The porosity of the ozone-adsorbing molded product of the present invention is suitably in the range of 30 to 70%. This range of porosity is suitable for contact with adsorption surfaces and an ozone-containing gas.

Owing to the above-described composition, the present invention can provide ozone adsorbents which have high ozone-adsorbing power even in a moisture-containing system and exhibit a high degree of ozone retention and a low degree of ozone decomposition, and thereby contributes to the practical use of ozone storage apparatus and ozone concentration apparatus based on a pressure-swinging or temperature-swinging adsorption process. Moreover, when such ozone adsorbents are molded into honeycombs or other forms, a high degree of ozone retention can be achieved by restricting the aluminum content in the binder and the residual carbon content in the molded products.

EXAMPLE 1

Using high-silica pentasilzeolite (with a $SiO_2/Al_2O_3$ ratio of 200), dealuminized faujasite (with a $SiO_2/Al_2O_3$ ratio of 70) and mesoporous silicate (with a $SiO_2/Al_2O_3$ ratio of 1,000) as ozone adsorbents, the amount of ozone adsorbed by each ozone adsorbent was measured. Silica gel was also used for comparative purposes. Specifically, 5 g of each of the aforesaid ozone adsorbents was charged into the adsorbent container 2 of testing equipment illustrated in FIG. 8. An ozone-containing gas produced by an ozone generator 1 based on the electrolysis of water was used for testing purposes. This gas was composed of 10 vol. % $O_3$, 87 vol. $O_2$ and 3 vol. % $H_2O$.

While the ozone adsorbent was kept at 25° C., the ozone-containing gas was introduced into the adsorbent container in such a way that the partial ozone pressure was adjusted to 0.1 atm. or 1 atm. by controlling the valves 5 and 6. The ozone concentration in the effluent gas from the adsorbent container was measured by means of an ozone analyzer 4. First of all, the saturation of the ozone adsorbent was confirmed by detecting ozone with the ozone analyzer 4. Thereafter, He gas was made to flow through the adsorbent container 2 by closing the valves 5 and 6, opening the valves 7 and 8, and turning the three-way valve 3. Thus, the desorbed ozone-containing gas was fed to the ozone analyzer 4. In this process, the flow rate of the gas fed to the ozone analyzer 4 was kept constant by adding He gas to the test gas by way of a mass flow controller 9. The total amount of ozone desorbed was determined and regarded as the amount of ozone adsorbed. FIG. 1 is a graph showing the amount of ozone adsorbed as a function of the partial ozone pressure. It can be seen from FIG. 1 that, as to the amount of ozone adsorbed, high-silica pentasilzeolite and mesoporous silicate are excellent, and even dealuminized faujasite is superior to silica gel. If the adsorption pressure and the desorption pressure are set at 1 atm. and 0.1 atm., respectively, the difference therebetween in the amount of ozone adsorbed as shown in FIG. 1 corresponds to the amount of ozone which can be treated. Accordingly, it can be seen that high-silica pentasilzeolite and mesoporous silicate are especially suitable for the concentration of ozone by a pressure-swinging process.

Next, the amount of ozone adsorbed was measured under the same conditions as described above, except that the flow rate of the ozone-containing gas was controlled with the valves 5 and 6 so as to give a partial ozone pressure of 0.1 atm. and the temperature of the ozone adsorbent was varied from −60° C. to 30° C. FIG. 2 is a graph showing the amount of ozone adsorbed as a function of the adsorption temperature. It can be seen from FIG. 2 that, as to the amount of ozone adsorbed, high-silica pentasilzeolite and mesoporous silicate are excellent, and even dealuminized faujasite is superior to silica gel. If the adsorption temperature and the desorption temperature are set at −60° C. and 30° C., respectively, the difference therebetween in the amount of ozone adsorbed as shown in FIG. 2 corresponds to the amount of ozone which can be treated. Accordingly, it can be seen that high-silica pentasilzeolite and mesoporous silicate are especially suitable for the concentration of ozone by a temperature-swinging process.

EXAMPLE 2

Figure 3:
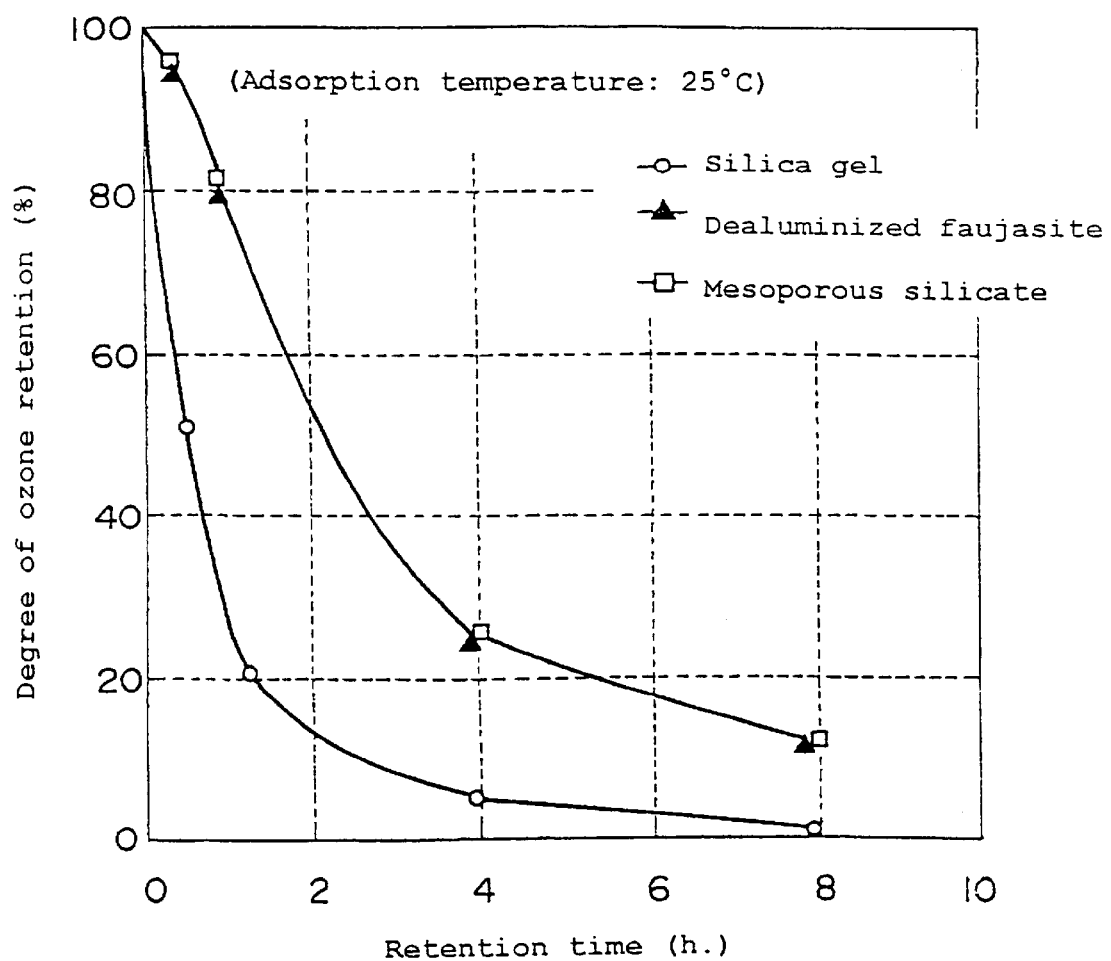
FIG. 3 is a graph showing the degree of ozone retention at an adsorption temperature of 25° C. as a function of retention time for dealuminized faujasite and mesoporous silicate in accordance with the present invention, and silica gel conventionally known as an ozone adsorbent.

The same silica gel, dealuminized faujasite and mesoporous silicate as used in Example 1 were used as ozone adsorbents. Each of these three ozone adsorbents was charged into the adsorbent container 2 of the testing equipment illustrated in FIG. 8. An ozone-containing gas was introduced into the adsorbent container 2 under the same conditions as described in Example 1, except that the adsorption temperature was set at 25° C. and the partial ozone pressure of the ozone-containing gas for testing use was kept at 0.1 atm. After the saturation of the ozone adsorbent was confirmed by detecting ozone with the ozone analyzer 4, the valves 5 and 6 were closed and the ozone adsorbent was held in that state for a period of 30 minutes, 1 hour, 4 hours or 8 hours. Thereafter, He gas was made to flow through the adsorbent container 2 by closing the valves 5 and 6, opening the valves 7 and 8, and turning the three-way valve 3. Thus, the desorbed ozone-containing gas was fed to the ozone analyzer 4, so that the total amount of ozone desorbed was measured. The degree of ozone retention was determined as the ratio of the total amount of ozone desorbed to the total amount of ozone introduced into the adsorbent container 2 (from which the amount of ozone having initially broken through was subtracted). In FIG. 3, the degree of ozone retention is shown as a function of retention time. It can be seen that the degree of ozone retention is reduced as the retention time becomes longer, indicating the corresponding decomposition of ozone. In particular, silica gel shows a faster reduction in the degree of ozone retention than dealuminized faujasite and mesoporous silicate.

Figure 4:
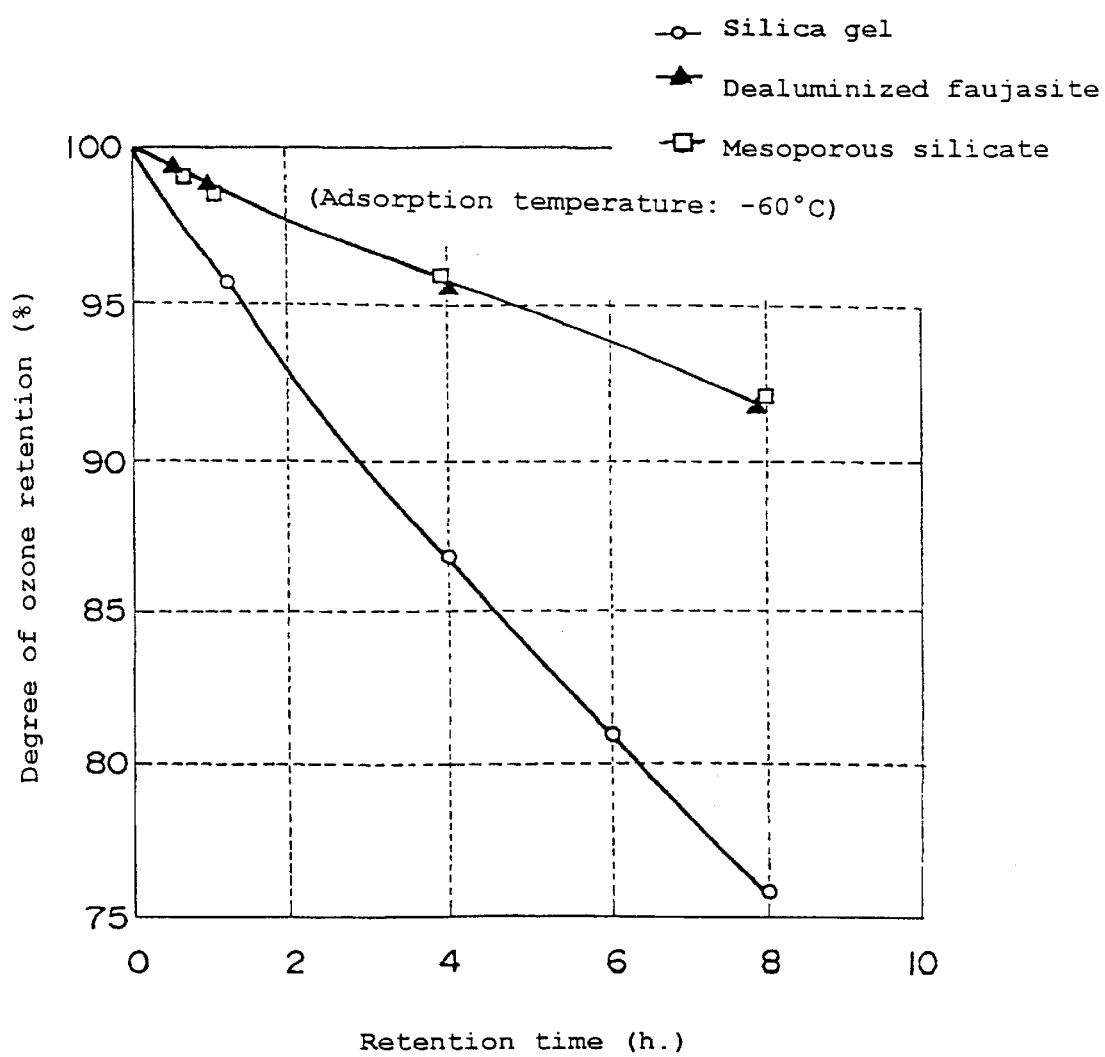
FIG. 4 is a graph showing the degree of ozone retention at an adsorption temperature of −60° C. as a function of retention time for dealuminized faujasite and mesoporous silicate in accordance with the present invention, and silica gel conventionally known as an ozone adsorbent.

Next, the degree of ozone retention was determined at varying retention times in the same manner as described above, except that the adsorption temperature was altered to −60° C. The results thus obtained are shown in FIG. 4. As compared with FIG. 3 showing the results of determination at an adsorption temperature of 25° C., the degree of ozone retention was more gently reduced as a function of retention time. However, it can be seen that, while silica gel shows a more marked reduction in the degree of ozone retention than dealuminized faujasite and mesoporous silicate, dealuminized faujasite and mesoporous silicate maintain a degree of ozone retention of as high as 92% even after the lapse of 8 hours. That is, when ozone is stored for a long period of time, the use of dealuminized faujasite and mesoporous silicate at as low an adsorption temperature as possible is effective in preventing the loss of ozone due to decomposition and thereby enhancing the recovery of ozone.

EXAMPLE 3

Figure 9:
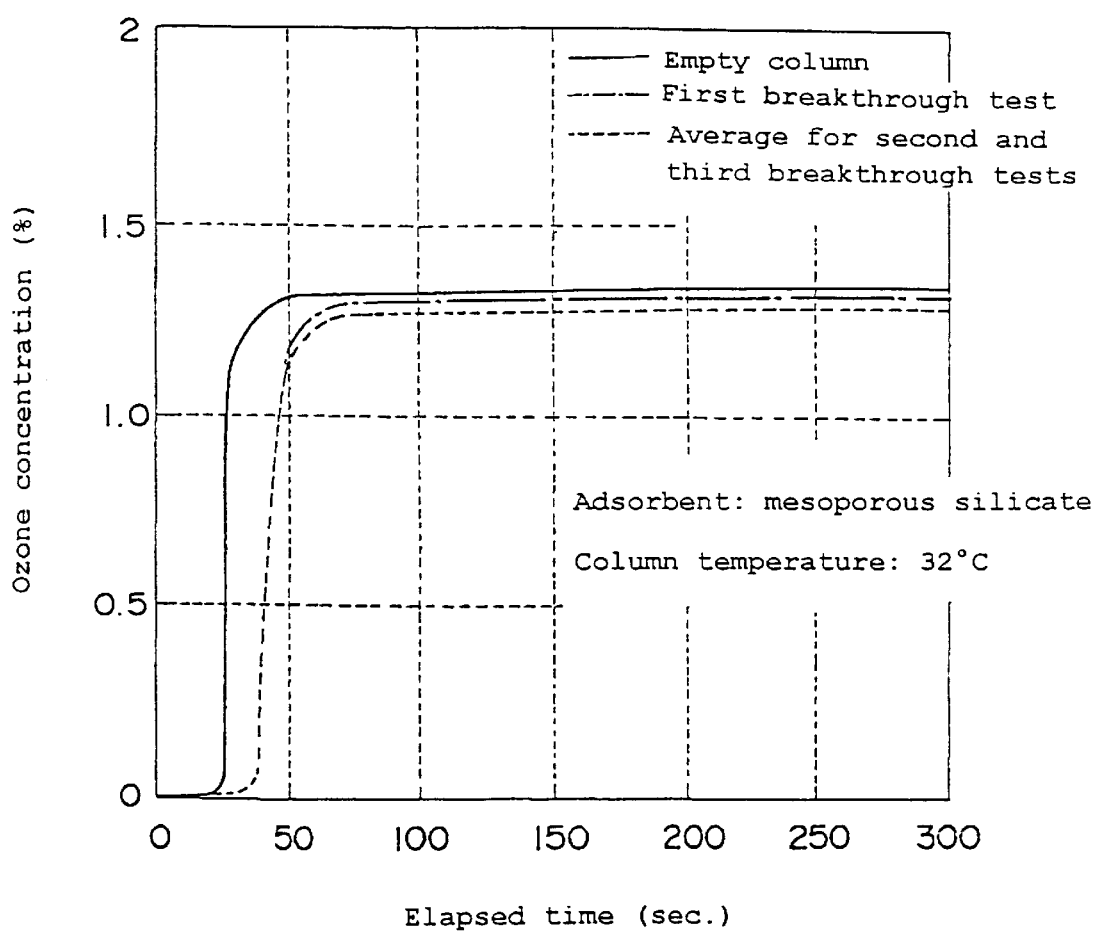
FIG. 9 is a graph showing a breakthrough curve at an adsorption temperature of 32° C. for mesoporous silicate in accordance with the present invention.

Mesoporous silicate capable of adsorbing a large amount of ozone was charged into the adsorbent container 2 of the testing equipment of Example 1. While the adsorption temperature was set at 32° C., the same ozone-containing gas for testing use as in Example 1 was introduced thereinto at a flow rate of 240 mlN/min. by opening the valves 5 and 6 and closing the valves 7 and 8. The effluent gas from the adsorbent container 2 was diluted sevenfold by adding He gas thereto by way of the mass flow controller 9, and its ozone concentration was measured with the ozone analyzer 4. FIG. 9 shows changes in ozone concentration with elapsed time. Changes in ozone concentration were previously measured for an empty column and are also shown in FIG. 9. This ozone breakthrough test was repeated three times. In FIG. 9, the area between the ozone breakthrough curve for an empty column and the ozone breakthrough curve for mesoporous silicate represents the amount of ozone adsorbed.

Figure 10:
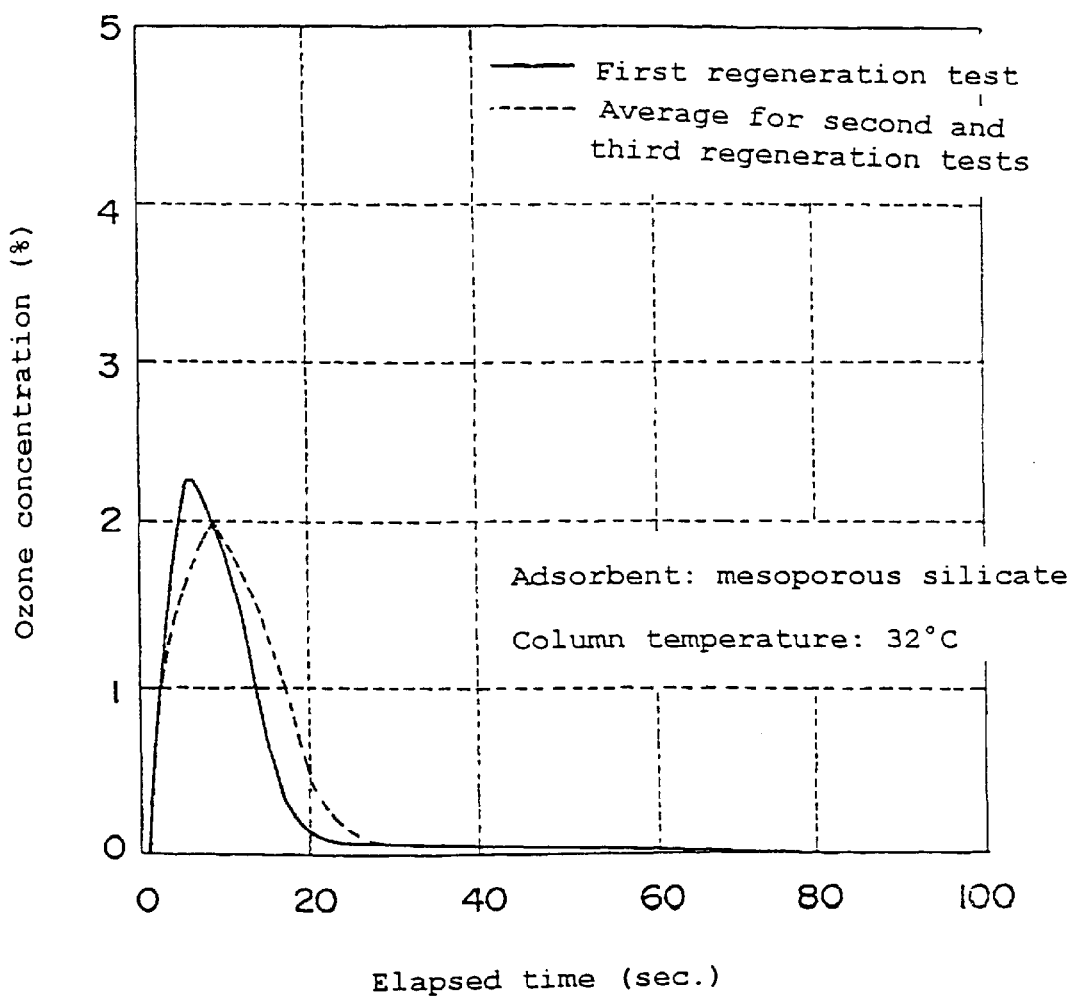
FIG. 10 is a graph showing a regeneration curve at an adsorption temperature of 32° C. for mesoporous silicate in accordance with the present invention.

After the adsorbent was saturated with ozone in the test of FIG. 9, He gas was made to flow therethrough at a flow rate of 305 mlN/min. by closing the valves 5 and 6, opening the valves 7 and 8, and turning the three-way valve 3. Thus, changes in ozone concentration with the time elapsed for the regeneration of the adsorbent were measured with the ozone analyzer 4 (the test gas was diluted sevenfold as described above). FIG. 10 shows regeneration curves so constructed. The amount of ozone recovered by desorption corresponds to the area between the regeneration curve for an empty column and the regeneration curve for mesoporous silicate.

In the above-described tests, the amount of ozone adsorbed as determined from FIG. 9 was almost equal to the amount of ozone recovered by desorption as determined from FIG. 10, indicating that essentially no decomposition of ozone occurred between its adsorption and desorption.

Figure 11:
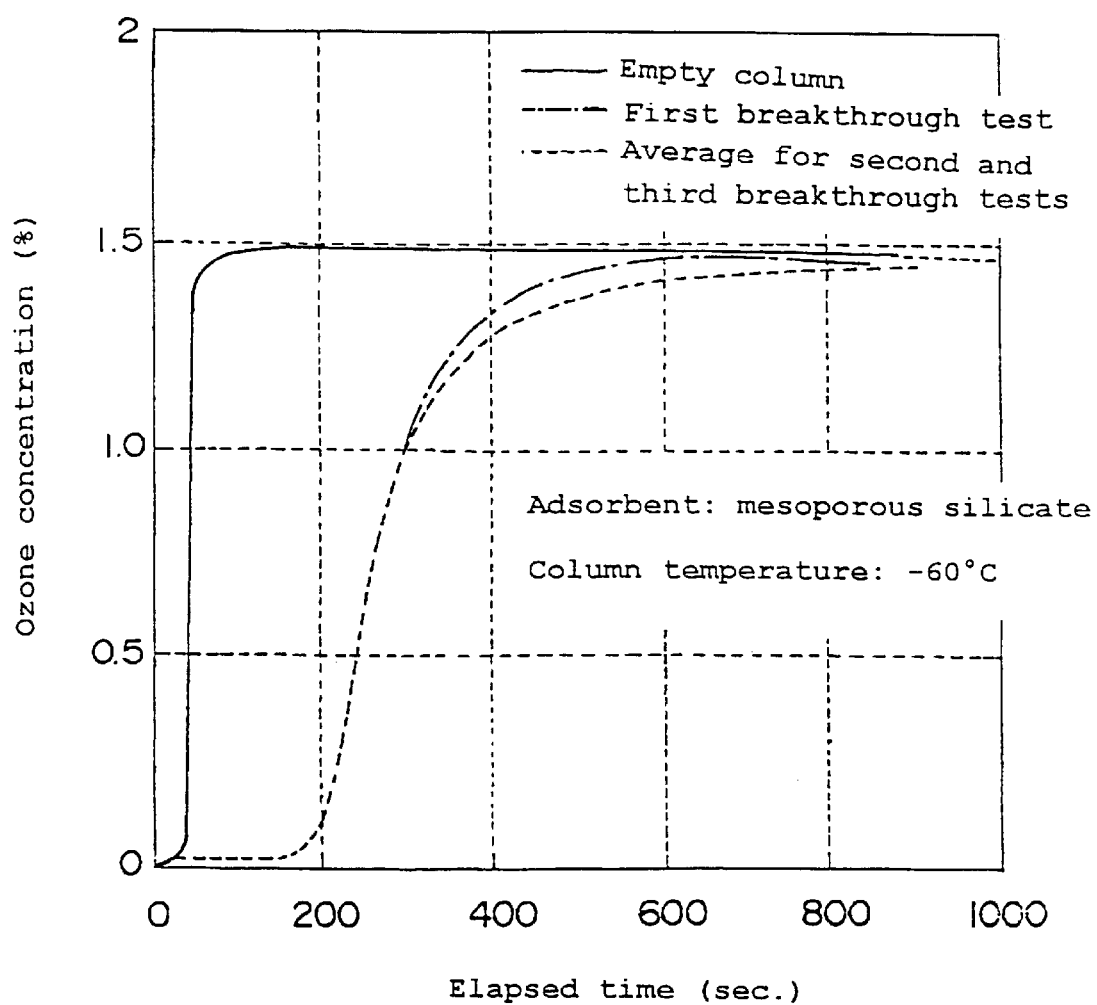
FIG. 11 is a graph showing a breakthrough curve at an adsorption temperature of −60° C. for mesoporous silicate in accordance with the present invention.
Figure 12:
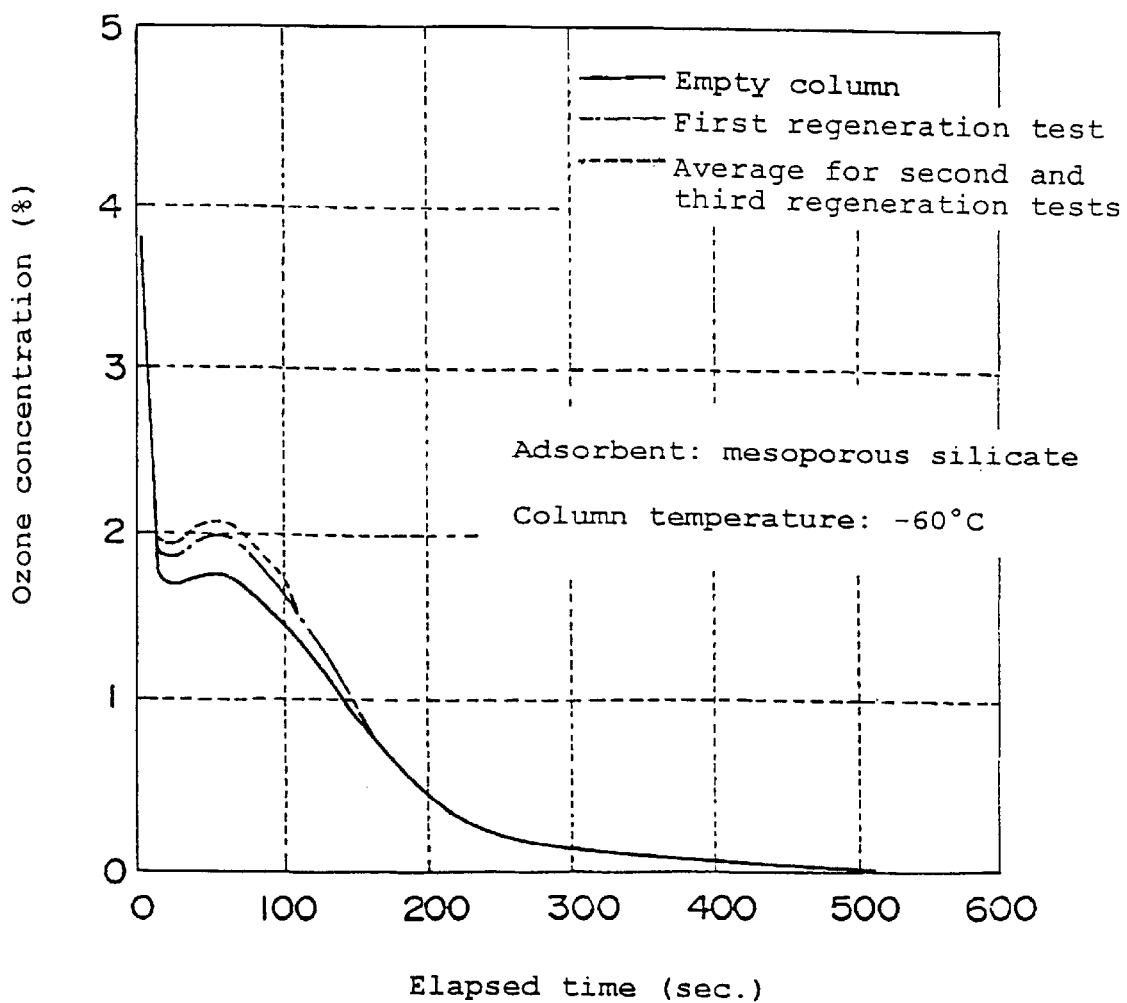
FIG. 12 is a graph showing a regeneration curve at an adsorption temperature of −60° C. for mesoporous silicate in accordance with the present invention.

FIGS. 11 and 12 are graphs showing ozone breakthrough curves and regeneration curves, respectively, which were constructed in the same manner as for FIGS. 9 and 10, except that the adsorption temperature employed in the above-described breakthrough test was altered from 32° C. to −60° C. Also in these tests, the amount of ozone adsorbed as determined from FIG. 11 was almost equal to the amount of ozone recovered by desorption as determined from FIG. 12, indicating that essentially no decomposition of ozone occurred between its adsorption and desorption.

EXAMPLE 4

First of all, ozone-adsorbing molded products were made. Specifically, a total of four silica sol binders (i.e., one silica sol binder containing essentially no aluminum, and three silica sol binders containing 10, 20 or 30% by weight of aluminum) were provided. 60 parts by weight of each silica sol binder, 5 parts by weight of cellulose as an organic pore-forming agent, and 1 part by weight of a high polymeric flocculent were added to 100 parts by weight of dealuminized faujasite or mesoporous silicate. After these components were well mixed together with water, the resulting mixture was molded into the form of a honeycomb suitable for placement in the adsorbent container shown in FIG. 8. The molded body was dried and fired at 650° C. for 1 hour to obtain an ozone-adsorbing molded product. The four molded products so made had a porosity of 70% and a residual carbon content of 1% by weight.

Figure 8:
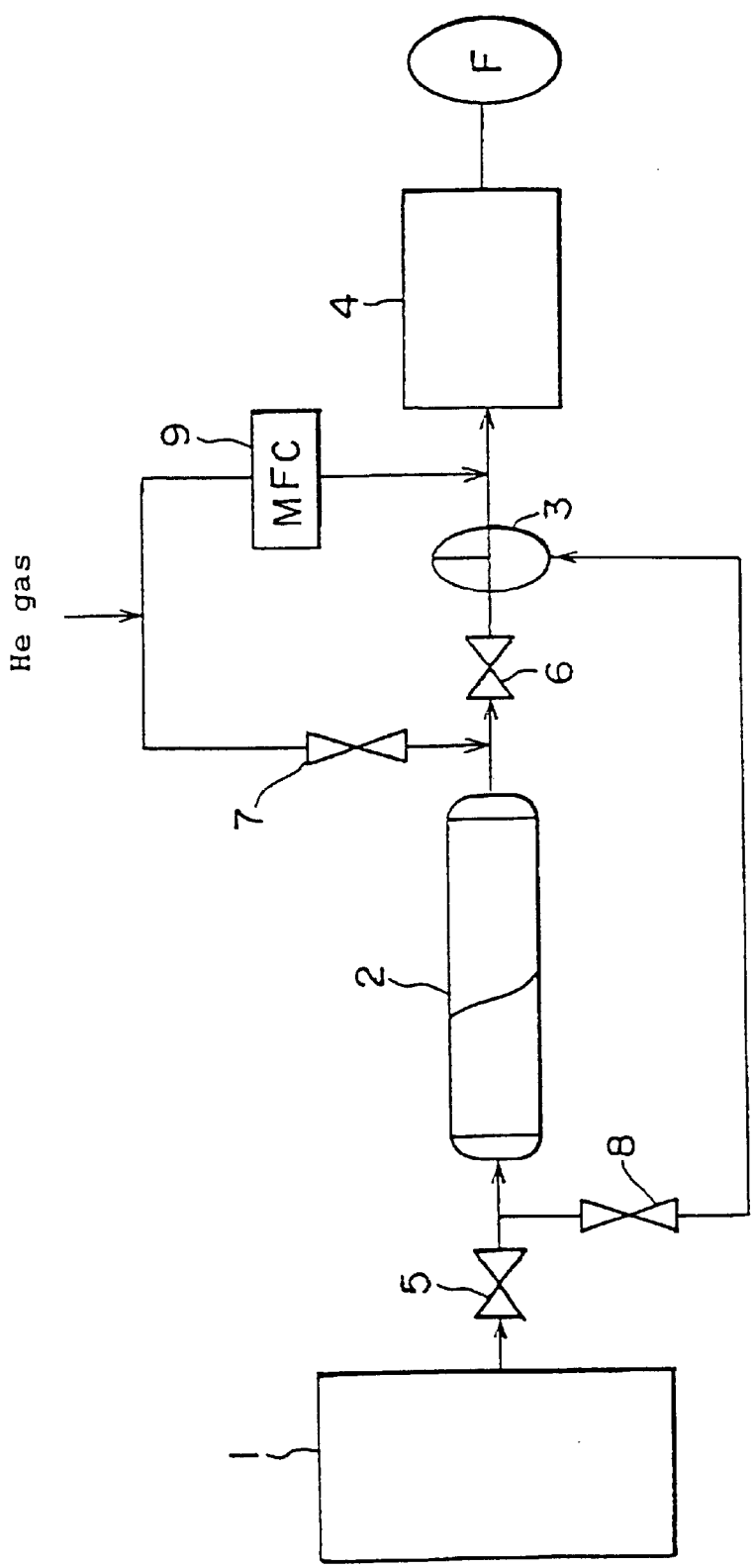
FIG. 8 is a schematic illustration of equipment for testing the ozone adsorption characteristics described in the Examples.

The adsorbent container 2 shown in FIG. 8 was charged with each of the above-described four ozone-adsorbing molded products (weighing 5 g). Then, the same ozone-containing gas for testing use as in Example 1 was supplied to the adsorbent container 2 by opening the valves 5 and 6 and closing the valves 7 and 8. Thus, the aforesaid ozone adsorbent was saturated with ozone and held in that state for 8 hours. Thereafter, He gas was supplied to the rear end of the adsorbent container 2 by closing the valves 5 and 6, opening the valves 7 and 8, and turning the three-way valve 3. Thus, the ozone adsorbed to the adsorbent was desorbed by purging and the ozone concentration in the effluent gas was measured with the ozone analyzer 4. The ratio of the total amount of ozone desorbed to the total amount of ozone adsorbed in the saturated state was regarded as the degree of ozone retention, and the relationship between the aluminum content in the binder and the degree of ozone retention is shown in FIG. 6. It can be seen from FIG. 6 that, if the degree of ozone retention is set at 90% from a practical point of view, the aluminum content in the binder must be kept within 2% by weight for both dealuminized faujasite and mesoporous silicate. In the case of silica gel, the degree of ozone retention is limited to about 76% because moisture is strongly adsorbed thereto prior to ozone in a moisture-containing system, it is difficult to recover the adsorbed ozone completely by desorption, and the degree of ozone decomposition is high.

EXAMPLE 5

Next, ozone-adsorbing molded products having different residual carbon contents were made. Specifically, 60 parts by weight of a silica sol binder containing essentially no aluminum, 5 parts by weight of cellulose as an organic pore-forming agent, and 1 part by weight of a high polymeric flocculent were added to 100 parts by weight of dealuminized faujasite or mesoporous silicate. After these components were well mixed together with water, the resulting mixture was molded into the form of a honeycomb suitable for placement in the adsorbent container shown in FIG. 8. The molded body was dried and fired for 1 hour. By varying the firing temperature from 450° C. to 700° C., there were obtained a total of five ozone-adsorbing molded products each having a residual carbon content of 3% by weight, 2% by weight, 1% by weight or 0.5% by weight or containing essentially no carbon. The five molded products so made had a porosity of 70%.

The degree of ozone retention was determined in the same manner as in Example 4, except that each of the above-described five ozone-adsorbing molded products was used. The relationship between the residual carbon content and the degree of ozone retention is shown in FIG. 7. It can be seen from FIG. 7 that, if the degree of ozone retention is set at 90% from a practical point of view, the residual carbon content must be kept within 0.1% by weight for both dealuminized faujasite and mesoporous silicate.

What is claimed is:

1. An ozone-adsorbing molded product made by providing an ozone adsorbent powder comprising one or more members selected from the group consisting of high-silica pentasilzeolite having a $SiO_2/Al_2O_3$ ratio of not less than 70, dealuminized faujasite having a $SiO_2/Al_2O_3$ ratio of not less than 20, and mesoporous silicate having a $SiO_2/Al_2O_3$ ratio of not less than 20, and molding the powder by use of a $SiO_2$ binder having an aluminum content of not greater than 2% by weight, said ozone-adsorbing molded product having a porosity in the range of 30 to 70% and a residual carbon content of not greater than 0.1% by weight wherein said binder is in the range of 10 to 60 parts by weight per 100 parts by weight of the ozone adsorbent powder.

2. An ozone-adsorbing molded product as in claim 1, wherein said ozone-adsorbing molded product is in the form of a honeycomb.

3. A method of making an ozone-adsorbing molded product as in claim 1 which comprises the steps of adding said $SiO_2$ binder and an organic pore-forming agent to said ozone adsorbent powder, molding the resulting mixture, and drying and firing the molded body to remove said organic pore-forming agent and thereby form pores.

4. A method of making an ozone-adsorbing molded product as in claim 2 which comprises the steps of adding said $SiO_2$ binder and an organic pore-forming agent to said ozone adsorbent powder, molding the resulting mixture, and drying and firing the molded body to remove said organic pore-forming agent, and thereby form pores.

* * * * *